US008039061B2

(12) United States Patent
Takimoto

(10) Patent No.: US 8,039,061 B2

(45) Date of Patent: Oct. 18, 2011

(54) METHOD FOR PRODUCING HOSE WITH SEALING LAYER

(75) Inventor: Yorihiro Takimoto, Komaki (JP)

(73) Assignee: Tokai Rubber Industries, Inc. (JP)

( * ) Notice: Subject to any disclaimer, the term of this patent is extended or adjusted under 35 U.S.C. 154(b) by 873 days.

(21) Appl. No.: 12/057,516

(22) Filed: Mar. 28, 2008

(65) Prior Publication Data

US 2008/0248217 A1 Oct. 9, 2008

(30) Foreign Application Priority Data

Apr. 6, 2007 (JP) ................................ 2007-101169

(51) Int. Cl.

*B05D 7/22* (2006.01)
*H05H 1/00* (2006.01)
*H05H 1/24* (2006.01)
*B29C 59/16* (2006.01)
*B29D 22/00* (2006.01)
*B32B 1/08* (2006.01)
*B29C 47/00* (2006.01)

(52) U.S. Cl. ........ 427/536; 427/230; 427/535; 427/569; 264/447; 264/483; 428/35.7; 428/36.9; 428/36.91

(58) Field of Classification Search .................. 427/230, 427/237, 238, 535, 536, 569; 428/35.7, 36.9, 428/36.91; 264/447, 483; 138/109, 141
See application file for complete search history.

(56) References Cited

U.S. PATENT DOCUMENTS 5,378,510 A * 1/1995 Thomas et al. ............... 427/563
2006/0070677 A1 * 4/2006 Inoue et al. .................. 138/109

FOREIGN PATENT DOCUMENTS

JP 8-270875 10/1996
JP 9-144955 6/1997

* cited by examiner

*Primary Examiner* — Frederick Parker
*Assistant Examiner* — Michael Wieczorek
(74) *Attorney, Agent, or Firm* — Andrus, Sceales, Starke & Sawall, LLP

(57) ABSTRACT

In a method for producing a hose with a sealing layer, a hose body having a resin innermost layer is prepared, a rod-like core member is disposed through a center portion of a hollow interior of a connecting portion of the hose body so as to occupy the center portion, and the plasma gas is fed and distributed in an interior of an innermost layer of the connecting portion to modify an inner surface of the innermost layer. Then, the sealing layer is formed on the inner surface by coating an elastic material for the sealing layer on the inner surface of the connecting portion.

13 Claims, 16 Drawing Sheets

46
32
12B
16
22
18
34
54
48
50

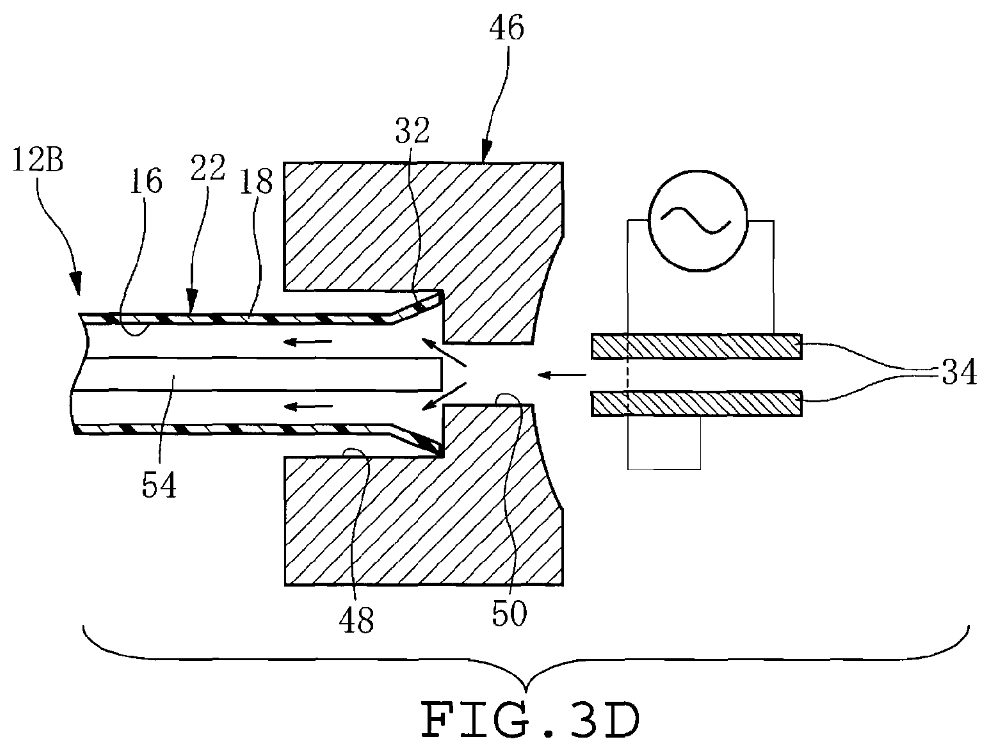
FIG.3D
FIG.3E
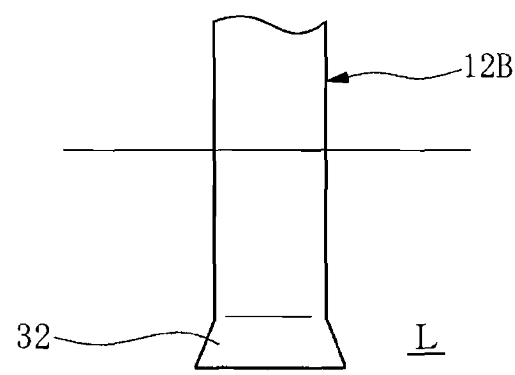

FIG.3F
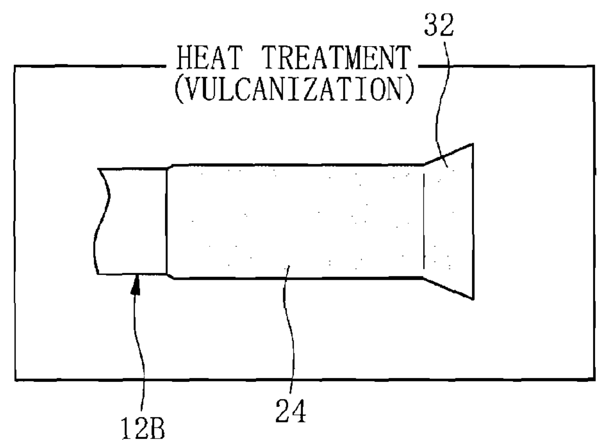
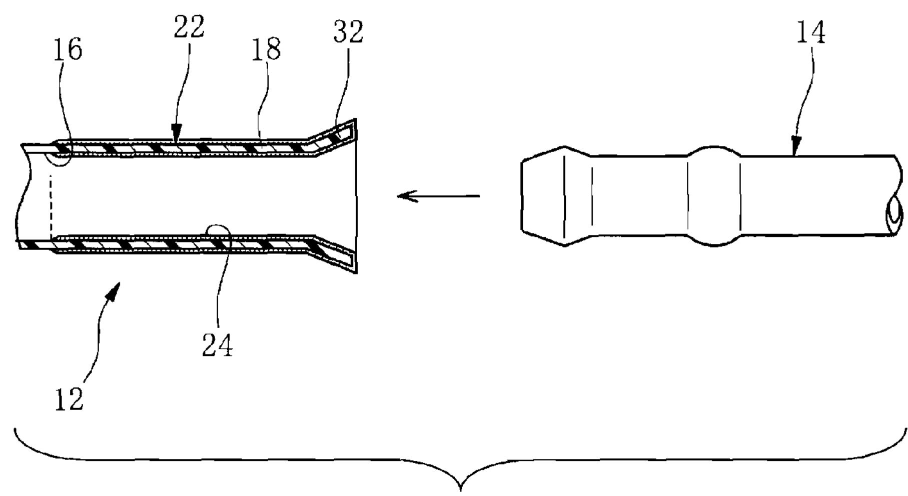
FIG.3G

P
37
38
36
34
34
40
50
32
52
48
46
22
18
16
42
44
54
12B

METHOD FOR PRODUCING HOSE WITH SEALING LAYER

FIELD OF THE INVENTION

The present invention relates to a method for producing a hose with a resin layer defining an innermost layer, specifically, a hose with a sealing layer that is formed from an elastic material on an inner surface of a connecting portion of an end portion of the hose. The hose is suitable for conveying carbon hydride such as gasoline, light oil, compressed natural gas and liquefied petroleum gas, hydrogen, dimethyl ether, alcohol, warm water or a refrigerant for an air conditioner, etc.

DESCRIPTION OF THE RELATED ART

Conventionally, a hose with an innermost layer of a resin layer has been used for piping in vehicles.

For example, a hose with an innermost layer of a fluorine resin has been used for a fuel conveying hose of a motor vehicle.

The fuel conveying hose can be provided with enhanced gasoline-permeation resistance by including an innermost layer of such fluorine resin layer.

And, for connecting this type of the hose to a mating metal pipe, a resin connector, so-called a quick connector has been used in the past.

For example, a structure for connecting a hose and a pipe with use of such connector is disclosed in Patent Document 1, below.

FIG. 12 specifically shows this connecting structure. Here, a resin connector 202 is attached to an end portion of a hose 200 initially, and a mating metal pipe 204 is relatively inserted in the connector 202, and thereby the hose 200 and the metal pipe 204 are connected to each other via the connector 202 in locked relation. A seal is formed between the connector 202 and the metal pipe 204 by O-rings 206 that are disposed in the connector 202, and a seal is provided between the connector 202 and the hose 200 by an O-ring that is disposed on the connector 202.

However, when the hose 200 and the metal pipe 204 are connected by use of such resin connector 202, there is fear that the connector 202 hits against other parts or components and is broken in a car collision. Accordingly, it is considered to connect a hose directly to a metal pipe without using such connector 202.

However, an innermost layer of the hose formed from a resin layer is generally less elastic. So, when the hose is connected to the metal pipe by force-fitting the metal pipe directly and relatively into the hose, it is difficult to secure sealing properties in a connecting portion of the hose.

One possible means to ensure the sealing properties is to fit an O-ring for a seal made of an elastic material on an outer peripheral surface of the metal pipe, and to force-fit the metal pipe relatively in this state into the hose to provide a seal between the metal pipe and the hose simultaneously with connection of the hose and the metal pipe.

However, in the seal provided by the O-ring, there is a problem that the O-ring may be displaced during force-fitting of the hose, or the O-ring may move rotationally in the connecting portion when a rocking force acts on the metal pipe, and the hose, etc.

Another possible means is to form a coating of a sealing layer made of an elastic layer on a connecting region between the metal pipe and the hose in adherent relation, thereby providing a seal by the sealing layer in the connecting portion.

The coating of the sealing layer may be formed on an outer surface of the metal pipe or on an inner surface of the hose, specifically, an inner surface of the connecting portion of a hose end portion in adherent relation.

However, a longest metal pipe for piping of a motor vehicle is as long as about 5 m. In fact, it is difficult to form the sealing layer made of the elastic material on an outer surface of such a long metal pipe. Therefore, or generally, it is reasonable to form the sealing layer of the elastic material on the inner surface of the end portion of the hose.

Such technique to form the sealing layer of the elastic material on the inner surface of the connecting portion of the hose is disclosed, for example, in Patent Document 2 as below.

By the way, in a hose including a resin layer defining an innermost layer, such resin layer should be made of a material having high chemical resistance in order to meet requirements for various fluids, such as low-permeability to a conveyed fluid.

However, such material of high chemical resistance is chemically inactive and is less adhesive. Therefore, in a hose that is provided with a sealing layer simply by coating of an elastic material for a seal on an inner surface thereof, the sealing layer may be peeled off when a metal pipe is force-fitted in the hose.

One of possible solutions for this problem is to modify an inner surface of an innermost layer of a hose or hose body by corona treatment prior to coating of a sealing layer in order to improve receptivity to an adhesive.

The corona treatment is known as means for providing a surface of a polymer material with receptivity to an adhesive. So, the corona treatment is applied as means for providing receptivity to the adhesive on the inner surface of the hose, specifically, the inner surface of an innermost layer of a resin layer.

However, actually, the result of the corona treatment was found not satisfactory.

In FIGS. 13 and 14, views specifically show a method of the corona treatment that was actually examined.

Here, an extremity of a hose (resin hose) or hose body 210 including an innermost layer 208 of a resin layer is initially radially expanded and deformed to form a flared portion 214 of a trumpet shape in a connecting portion 212 of the hose 210 (refer to FIGS. 13A, B).

The reason for providing the flared portion 214 of the trumpet shape is to facilitate force-fitting of a metal pipe 204 in the hose 210 in a following process.

Next, as shown in FIG. 13C, an electrode 216 is inserted and set in a center portion of a hollow interior of the hose 210 with the flared portion 214. A sine wave voltage as shown in FIG. 15 is applied between the hose 210, specifically the innermost layer 208 as the other electrode and the electrode 216 to generate corona discharge therebetween, and an inner surface of the innermost layer 208 is modified by the corona discharge (also refer to FIG. 14).

After that, a coating of a sealing layer 218 made of an elastic material is formed on the inner surface of the hose 210, namely on the inner surface of the innermost layer 208 along an entire length of the connecting portion 212 of the hose 210.

Here, a rubber material is used for the sealing layer 218. The coating is carried out by dipping the hose 210 in a coating liquid. Resultantly, the sealing layer 218 is formed on an outer surface as well as the inner surface of the hose 210 (refer to FIG. 13D).

And, after the dipping process as stated above, vulcanization is conducted to form and adhere the sealing layer 218 on the inner surface of the innermost layer 208.

However, countless fine dents or rises are formed entirely over the inner surface of the innermost layer 208 of the hose or hose body 210 serving as the other electrode, and it is hard to strictly keep a constant radial distance between the electrode 216 and the inner surface of the hose 210. Thus, in the corona treatment, it is difficult to control a voltage between a pair of the electrodes (208, 216). As a result, the voltage readily reaches in a range S of FIG. 15 where a lightning discharge (spark discharge) occurs and sparks are produced.

When such sparks are produced, the innermost layer 208 is partially molten, or according to the circumstances, has a hole.

And, in the connecting portion 212 of the hose 210, a radial distance between the flared portion 214 of the trumpet shape and the electrode 216 is different from a radial distance between a rest portion of a straight shape (straight tubular shape) and the electrode 216, and the corona treatment cannot be carried out well on an inner surface of the flared portion 214, more specifically, an inner surface of the innermost layer 208 of the flared portion 214. As a result, there is a problem that an adhesion strength of the sealing layer 218 is very low on the flared portion 214.

Then, another technique or method for producing a hose with a sealing layer is disclosed in Patent Document 3 as below. In this method, a plasma gas is generated by glow discharge between a pair of electrodes, and fed in an interior of an innermost layer of a connecting portion of the hose to modify an inner surface of the innermost layer by an action of the plasma gas. After that, a coating of an elastic material for a sealing layer is applied on the inner surface of the innermost layer of the connecting portion, and the sealing layer is formed and adhered thereto.

FIG. 16 specifically illustrates this case.

In the Figure, reference numeral 220 indicates an abutment die for an end portion of a hose or hose body 210, and the abutment die 220 includes an insertion space 222 for accommodating the end portion of the hose 210.

Reference numeral 224 indicates a gas flow-in space or gas introducing space extending through the abutment die 220, continuously from the insertion space 222 in a direction away from the insertion space 222, and reference numeral 226 indicates an abutment portion for abutting against an axial end or an axial end surface of the hose 210, thereby positioning the axial end of the hose 210 to control an inserted length of the hose 210.

Here, the abutment portion 226 also serves as a blocking portion for blocking a plasma gas fed through the gas flow-in space 224 from flowing around an outer peripheral surface of the hose 210.

According to the method as shown in FIG. 16, a glow discharge is generated by applying a low voltage between a pair of electrodes to create a plasma gas initially, and the plasma gas is fed through the gas flow-in space 224 to an interior of a connecting portion 212 of the hose 210. Then, the plasma gas is fed axially in the interior of the connecting portion 212 and caused to act on an inner surface of the connecting portion 212, namely an inner surface of the resin innermost layer 208, to modify the inner surface of the resin innermost layer 208.

When the glow discharge is generated by applying the low voltage between the pair of electrodes, gas molecules therebetween are dissociated into ions, electrons, radicals, atoms, molecules, etc. through collision of electrons, thereby a plasma gas including various chemical species is created there.

When an action of such plasma gas is caused on the innermost layer 208 of the resin layer, breakage of organic bonding occurs in the innermost layer 208, and various functional groups including oxygen, specifically carbonyl group and hydroxyl group, etc. including oxygen are generated in the innermost layer 208. And, at the same time, etching effects of the plasma gas causes the inner surface (first surface) of the innermost layer 208 to have a finely rough surface.

According to the method disclosed in Patent Document 3, in a subsequent process, a coating of an elastic material for the sealing layer is applied on the inner surface of the innermost layer 208, and the sealing layer is then formed and adhered thereto. In this method, the sealing layer is adhered to the inner surface of the innermost layer 208 with a strong adhesion force.

So, in the hose 210 including such coating of the sealing layer adhered to the innermost layer, the sealing layer can be well prevented from peeling off when a metal pipe 204 is force-fitted relatively in and connected to the end portion of the hose 210. This can establish highly reliable connection between the hose 210 and the metal pipe 204.

And, according to this production method, an inner surface of a flared portion 214 can be also favorably modified, and the sealing layer can be adhered to the inner surface of the flared portion 214 with strong adhesion force.

However, the following problem is found in the subsequent study. In a hose 210 of FIG. 17 having an inner diameter D larger than that of the hose 210 as shown in FIG. 16, when a plasma treatment is carried out in the same manner as for the hose 210 of FIG. 16, an inner surface of a connecting portion of the hose 210 is not always modified well sufficiently.

In order to solve the foregoing problem, it was tried to increase flow rate of the plasma gas, or increase a duration time period of the plasma treatment. However, a desired level of an inner surface modification was not achieved sufficiently, namely, a sealing layer cannot be adhered with desired adhesion strength.

And, the method of increasing the flow-rate of the plasma gas or the duration time period of the plasma treatment is not always advantageous in view of large-scale production of the hose 210 even if the desired surface modification is achieved.

[Patent Document 1] JP-A-8-270875

[Patent Document 2] JP-A-9-144955

[Patent Document 3] US2006/0070677A1

Under the foregoing circumstances, it is an object of the present invention to provide a method for producing a hose with a sealing layer wherein good inner surface modification can be achieved by causing a plasma gas to act on an inner surface of an innermost layer of a connecting portion sufficiently even in a large diameter hose having a large inner diameter and a sealing layer can be adhered to the inner surface with strong adhesion force.

SUMMARY OF THE INVENTION

In accordance with the present invention, in order to achieve the foregoing object, there is provided a novel method for producing a hose with a sealing layer. In the method, first of all, a hose body having a resin layer is prepared. The resin layer defines an innermost layer. The hose body includes a connecting portion on an end portion of the hose body for being connected to a mating pipe. The connecting portion is formed to have a straight tubular portion including an inner surface and an outer surface that extend parallel to a direction of an axis of the hose body. Then, a rod-like core member is disposed through a center portion of a hollow interior of at least the straight tubular portion of the connecting portion so as to occupy the center portion. That is, the core member is disposed coaxially within the straight tubular portion of the connecting portion. The core member has an outer diameter smaller than an inner diameter of the straight tubular portion, and has, for example, a circular cross-section. The core member is formed so as not to allow a fluid to flow inside the core member.

Subsequently, a plasma gas is created by generating a glow discharge between a pair of electrodes, fed in an interior of the innermost layer of the connecting portion of the hose body, distributed in the direction of the axis along an annular space defined between an outer surface of the core member and an inner surface of the connecting portion or the innermost layer to act on the inner surface of the connecting portion or the innermost layer, and thereby modifies the inner surface of the innermost layer.

A sealing layer is formed on the inner surface of the connecting portion in adherent relation thereto by coating an elastic material for the sealing layer on the modified inner surface of the connecting portion after modifying the inner surface of the innermost layer. Now, the hose with the sealing layer is obtained.

The hose body preferably has a flared portion that is radially expanded in a trumpet shape at an extremity of the connecting portion. In this case, the core member is disposed also through a center portion of a hollow interior of the flared portion, and the plasma gas is also distributed through an annular space defined between the outer surface of the core member and the inner surface of the innermost layer of the flared portion. In this case, the core member may have a larger diameter at a portion thereof situated in the hollow interior of the flared portion than at a portion thereof situated in the hollow interior of the straight tubular portion.

The resin layer of the innermost layer in the hose body is preferably made of a melt-formable resin, for example, a fluorine-resin. And, a major component of the resin may be selected from the group consisting of ethylene tetrafluoroethylene, thermoplastic polyether-ester elastomer, polybutylene terephthalate, polyphenylene sulfide, polyethylene and polypropylene.

The hose with the sealing layer produced in this manner may be adapted for vehicles.

The plasma gas may be an atmospheric pressure plasma gas.

As stated above, in the present invention, the rod-like core member is disposed through a hollow portion of the straight tubular portion of the connecting portion of the hose body. The plasma gas that is created in advance is flown in the direction of the axis of the hose body through the annular space defined between the outer surface of the core member and the inner surface of the hose body to act on the inner surface of the connecting portion, thereby modifying the inner surface of the innermost layer. Then, the inner surface of the connecting portion is coated with the elastic material for the sealing layer, and the sealing layer is adhered to and formed on the inner surface thereof. In this manner, it is confirmed that even in a hose with a large inner diameter, the inner surface of the connecting portion can be favorably modified by action of the plasma gas and the sealing layer of the elastic material can be adhered to the inner surface of the resin innermost layer with high adhesive strength. The reason is as follows.

When the plasma treatment is applied to the hose (hose body) with the large inner diameter at the same flow rate of the plasma gas for the same time period as to a hose (hose body) with a small inner diameter, as a part of the plasma gas fed to the interior of the hose body just passes through the center portion of the hollow interior of the hose body without acting on the inner surface of the hose body in the hose with the large inner diameter, the plasma gas fed to the interior of the hose body does not entirely act on the inner surface of the hose body with high efficiency. It is assumed that thereby the effect of modifying the inner surface of the hose body with the large inner diameter is lowered.

So, in the present invention, the core member is disposed through the hollow interior of the hose body so as to occupy a center portion of the hollow interior in order to prevent the plasma gas fed from just passing throughout the center portion of the hollow interior of the hose body, and in this state, the plasma gas is distributed in the direction of the axis of the hose body along or through the annular space defined between the outer surface of the core member and the inner surface of the hose body to act on the inner surface of the hose body. According to this method, the plasma gas that is fed in the hollow interior of the hose body can be allowed to entirely contact the inner surface of the hose body with high efficiency, and the inner surface of the hose body can be well modified even by carrying out the plasma treatment at the same flow rate of the plasma gas.

In a subsequent process, when the inner surface of the hose body, specifically, the inner surface of the resin innermost layer of the connecting portion is coated with the sealing layer of the elastic material, the sealing layer can be adhered thereto with high adhesion strength.

According to the present invention, for the hose body including a flared portion that is radially expanded in a trumpet shape on an extremity of its connecting portion, the core member may be disposed also through a center portion of a hollow interior of the flared portion, and the plasma gas is distributed also through an annular space defined between the outer surface of the core member and the inner surface of the innermost layer of the flared portion, thereby the inner surface of the flared portion can be modified. In this manner, the inner surface of the flared portion can be also modified well, and adhesion strength of the sealing layer can be enhanced also on the flared portion.

In this case, the core member may have a larger diameter at a portion thereof situated in the hollow interior of the flared portion than at a portion thereof situated in the hollow interior of the straight tubular portion. In this manner, the sectional area of the flow path of the plasma gas in the flared portion may be made close to, generally equal to, or equal to that of the flow path of the plasma gas in the straight tubular portion, thereby the inner surface of the flared portion can be modified much better.

In the present invention, for composing the above innermost layer a melt-formable resin may be used. The innermost layer may be formed by extrusion molding, blow molding, injection molding, rotational molding, spray forming, powder coating or other melt forming methods. By these methods, the hose (including any connection means such as a tube and a pipe) or the hose body may be formed in single layer structure or multilayer structure.

And, for the resin of the innermost layer, fluorine resin is suitable since the fluorine resin is considerably excellent in chemical resistance. However, the fluorine resin is chemically inert and has low receptivity to an adhesive. So, the present invention is very effective in particular when applied to a hose including an innermost layer made of such fluorine resin.

The fluorine resin suitable for the innermost layer here is, for example, ethylene-tetrafluoroethylene copolymer (ETFE), polyvinylidene-fluoride (PVDF), polyvinyl fluoride (PVF), polychlorotrifluoroethylene (PCTFE), ethylene-chlorotrifluoroethylene copolymer (ECTFE), ethylene-tetrafluoroethylene-hexafluoropropylene copolymer, hexafluoropropylene-tetrafluoroethylene copolymer (FEP), polytetrafluoroethylene (PTFE), tetrafluoroethylene-perfluoroalkyl vinyl ether copolymer (PFA), tetrafluoroethylene-hexafluoropropylene-perfluoroalkyl ethylene terpolymer, vinylidene fluoride-tetrafluoroethylene copolymer, vinylidene fluoride-hexafluoropropylene copolymer, tetrafluoroethylene-hexafluoropropylene-vinylidene fluoride terpolymer (THV), hexafluoropropylene-perfluoroalkyl vinyl ether, vinylidene fluoride-chlorotrifluoroethylene copolymer, vinylidene fluoride-perfluoroalkyl vinyl ether, vinylidene fluoride-tetrafluoroethylene-perfluoroalkyl vinyl ether, vinylidene fluoride-hexafluoropropylene-perfluoroalkyl vinyl ether, ethylene-tetrafluoroethylene-perfluoroalkyl vinyl ether, ethylene-hexafluoropropylene-perfluoroalkyl vinyl ether, ethylene-tetrafluoroethylene-hexafluoropropylene-perfluoroalkyl vinyl ether, etc. Specifically, ETFE is suitable in view of ease in fabrication of a tube.

Meanwhile, the innermost layer may include a conductive layer that defines an inner surface layer. That is, the innermost layer may comprise a conductive layer on an inner end of the innermost layer and a layer on an outer side of the conductive layer. The conductive layer and the layer on the outer side thereof may be formed from the same material.

On the other hand, for the sealing layer, various elastic materials such as acrylonitrile-butadiene rubber (NBR), butyl rubber, halogenated butyl rubber, acryl, ethylene-propylene-diene rubber (EPDM), ethylene-propylene rubber (EPM), thermoplastic elastomer, and elastic coating may be used in accordance with properties required for an internal fluid.

In particular, fluorine rubber type elastic material is suitable since the fluorine rubber type elastic material is excellent in heat resistance and chemical resistance.

And, the above material for the sealing layer may be rendered conductive.

In the present invention, the resin for the above innermost layer also may be suitably selected from the group consisting of thermoplastic polyester elastomer (TPEE), polybutylene terephthalate (PBT), polyphenylene sulfide (PPS), polyethylene (PE), and polypropylene (PP). Or, an alloy material including one of these resin materials and the above fluorine resin materials as its major component with improved conductivity, elasticity, shock resistance, etc. may be used.

The present invention is suitably applied to a hose used in vehicles.

In the present invention, an atmospheric pressure plasma may be applied in the plasma treatment.

The atmospheric pressure plasma does not require batch processing to achieve vacuum environment for a vacuum plasma, and may be produced continuously or constantly. In the vacuum plasma, there is a fear that plasticizer such as oil may be precipitated from the hose body during the treatment according to the conditions such as vacuum level of batch processing or time period for batch processing to achieve the vacuum environment, and when vacuum is shut off after the treatment, exuded oil etc. may attach or re-attach on a surface of the hose body. On the contrary, the atmospheric pressure plasma does not require the batch processing to achieve vacuum, and does not cause a problem of attachment or re-attachment of oil etc. on the surface of the hose body.

Now, the preferred embodiments of the present invention will be described below in detail with reference to the drawings.

BRIEF DESCRIPTION OF THE DRAWINGS

FIGS. 3A to 3G are views of steps of an embodiment of the production method for producing the hose of FIG. 1A.

DETAILED DESCRIPTIONS OF THE PREFERRED EMBODIMENTS

Figure 1A:
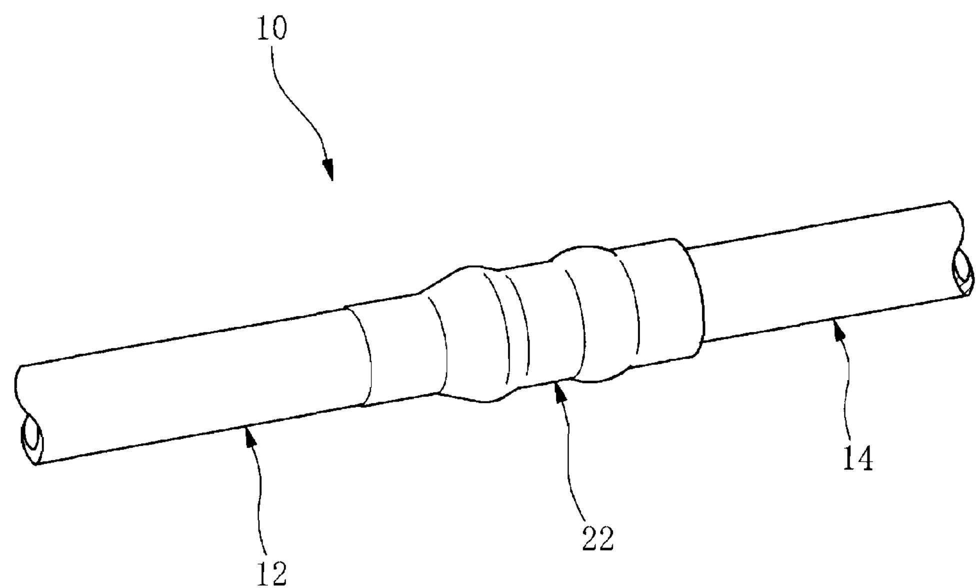
FIG. 1A is a perspective view showing a direct-connect hose assembly where a hose with a sealing layer produced by a production method of the present invention is connected to a metal pipe.
Figure 1B:
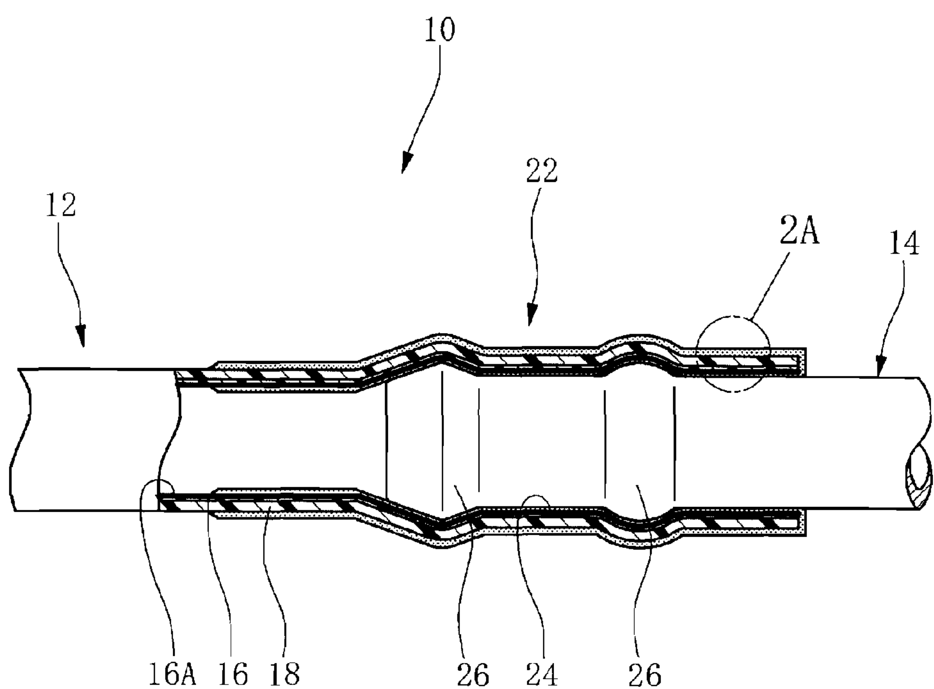
FIG. 1B is a view of the direct-connect hose assembly of FIG. 1A showing a connecting portion of the hose in cross-section.

In FIG. 1A, reference numeral 10 indicates so-called direct-connect hose assembly by assembling a hose 12 and a metal pipe 14 in unitary and directly fitting relation to each other. The hose 12 is used, for example, as an automotive fuel conveying hose. FIG. 1B shows a structure of a connecting region between the hose 12 and the metal pipe 14, with a sectional view of the hose 12.

Figure 2A:
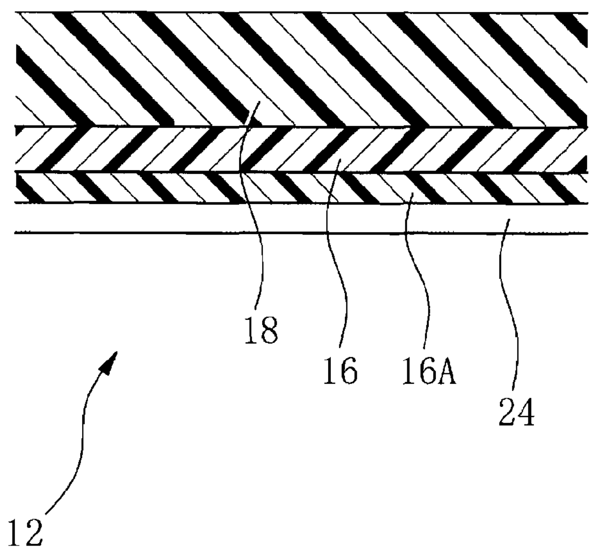
FIG. 2A is an enlarged view of a portion 2A of the hose in FIG. 1B.
Figure 2B:
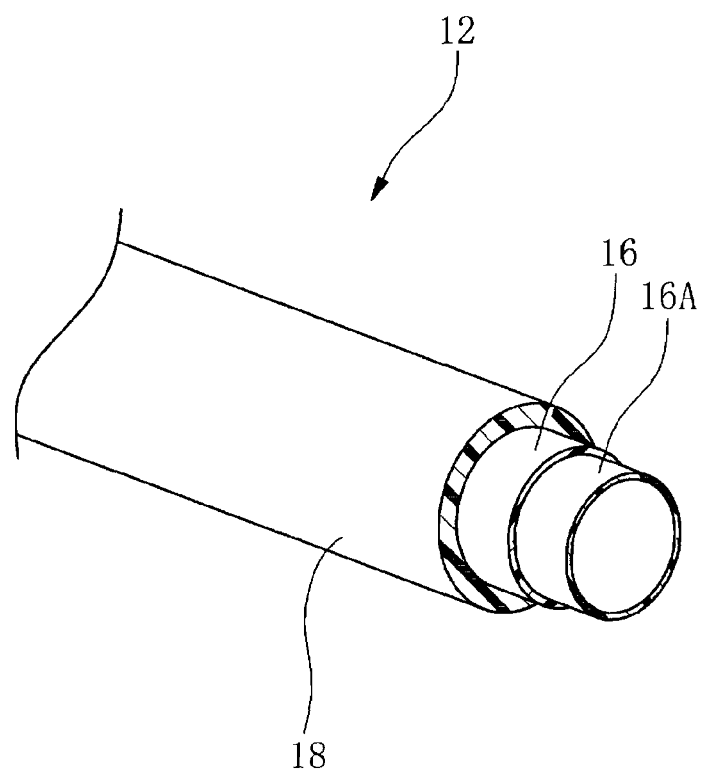
FIG. 2B is a perspective view of the hose of FIG. 1A, partly broken away, showing multilayer structure thereof.

As shown in FIGS. 1B, 2A and 2B, the hose 12 has a multilayer structure including an innermost layer 16 made of ETFE, and a resin layer 18 made of PA12 on an outer side of the innermost layer 16.

Here, an inner periphery portion of the innermost layer 16 of ETFE is a conductive layer 16A. That is, the conductive layer 16A defines an inner surface layer of the innermost layer 16, and the whole of the innermost layer 16 including the conductive layer 16A is made of the same resin material (here, ETFE).

Figure 2C:
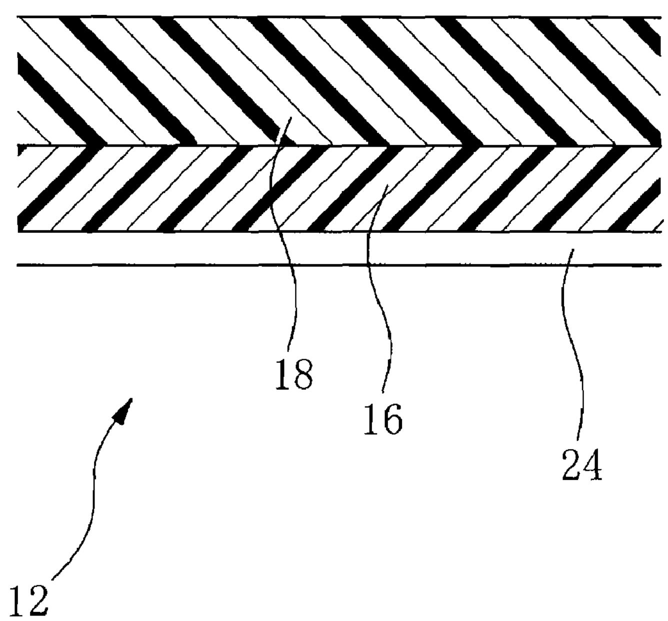
FIG. 2C is a view showing a modified multilayer structure of the hose.

Meantime, as shown in FIG. 2C, the multilayer structure of the hose 12 may not include the conductive layer 16A in the innermost layer 16. Namely, the whole of the innermost layer 16 may comprise a layer of uniform conductivity or non-conductivity. Needless to say, whether or not the multilayer structure of the hose 12 includes the conductive layer 16A, the following explanation may be applied to the hose 12.

However, when the resin material of the conductive layer 16A is different from that of a layer on an outer side of the conductive layer 16A, the conductive layer 16A is intended to be an innermost layer that is recited in appended claims.

Reference numeral 22 indicates a connecting portion of the hose 12 with the metal pipe 14. As shown in FIG. 1B, in this embodiment, an inner surface and an outer surface of the connecting portion 22, specifically, an inner surface of the innermost layer 16 and an outer surface of the resin layer 18, and a leading end surface of the connecting portion 22 are coated with a sealing layer 24 made of fluorine rubber.

Here, the sealing layer 24 is firmly adhered and fixed to the inner surface of the innermost layer 16.

On the other hand, the metal pipe 14 has a pair of bulged portions 26 on an end portion thereof. This end portion of the metal pipe 14 with the bulged portions 26 is force-fitted or press-fitted relatively in the connecting portion 22 of the hose 12, and connected to the connecting portion 22 of the hose 12 in directly fitting relation or assembled relation thereto.

Figure 3A:
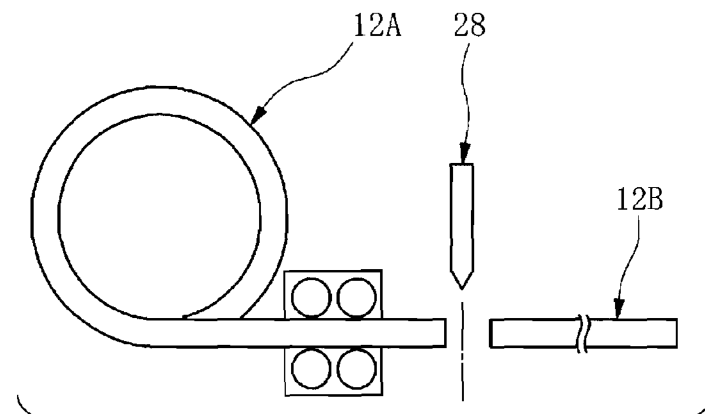
Figure 3B:
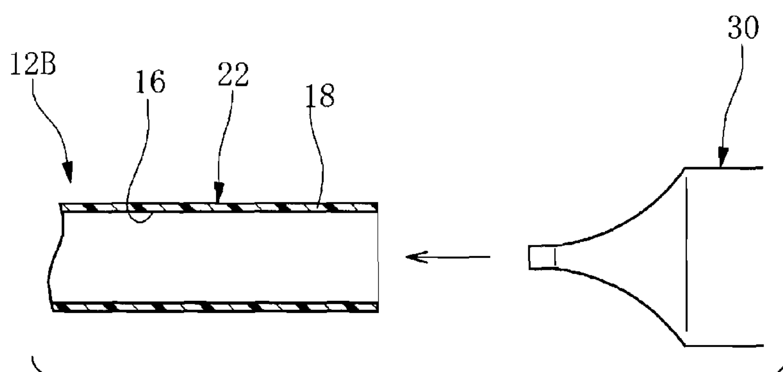
Figure 3C:
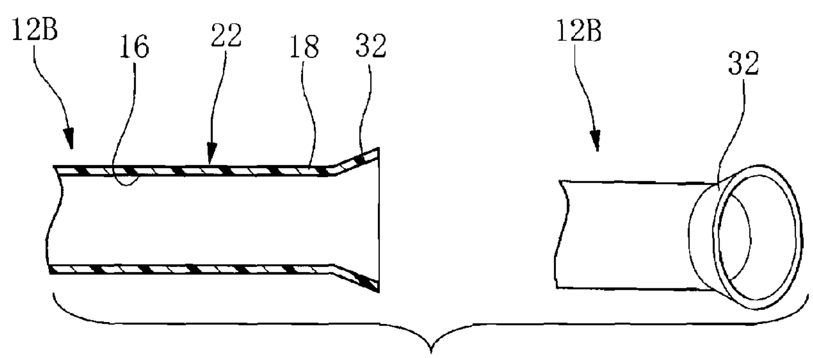
Figure 4:
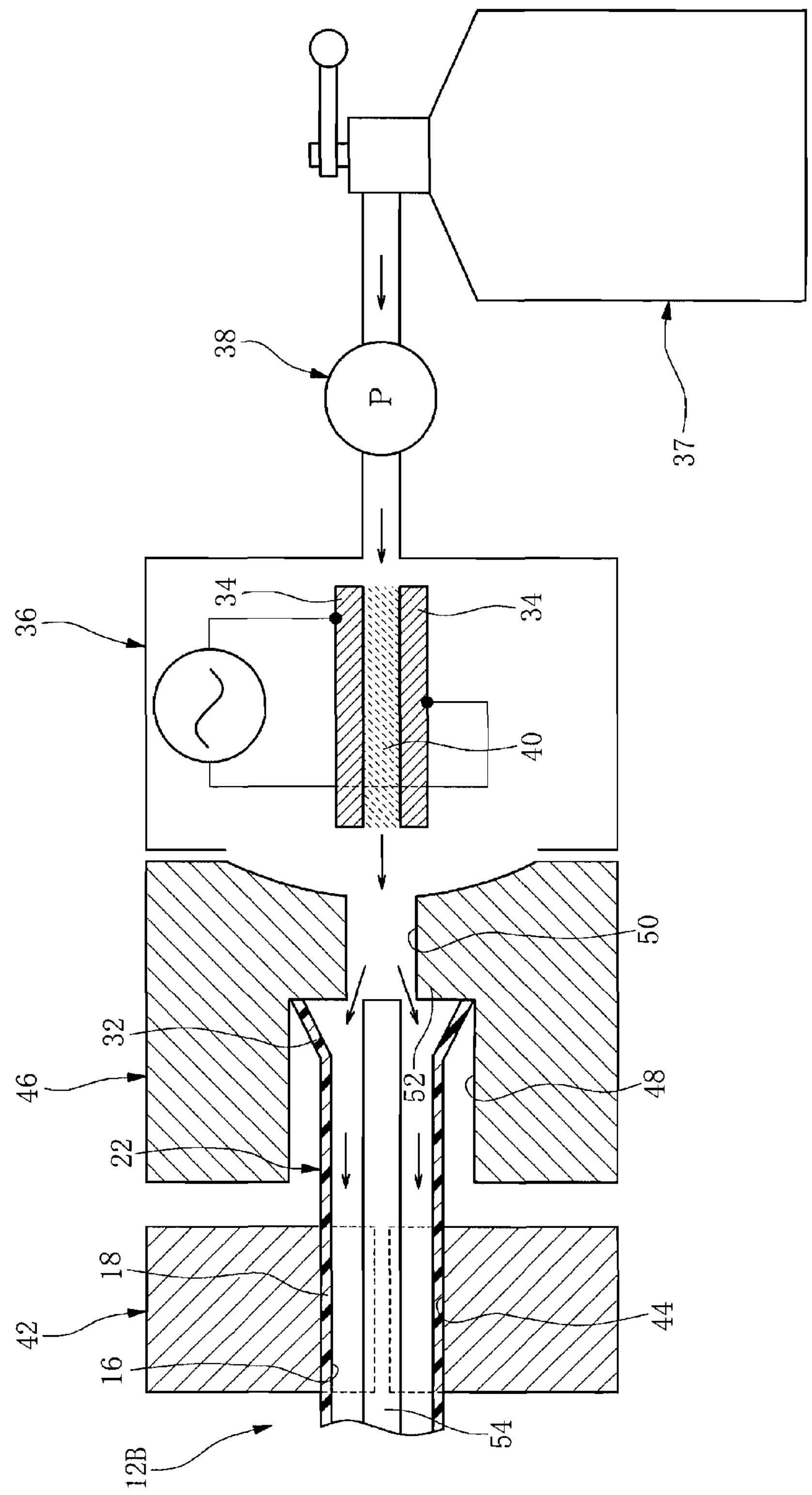
FIG. 4 is a view for explaining the step of FIG. 3D in more detail.

FIGS. 3 and 4 show a method for producing the hose 12 in order of steps.

As shown in FIG. 3A, an continuous elongate tubular hose body 12A having a multilayer structure including an innermost layer 16 and a resin layer 18 of PA12 on an outer side of the innermost layer 16 is prepared, and is successively cut into individual hose bodies 12B by a cutter 28, in the production method of this embodiment.

Then, as shown in FIG. 3B, an expanding jig 30 is pushed in an end portion of the hose body 12B to radially expand the end portion of the hose body 12B into a trumpet shape. Namely, the end portion of the hose body 12B is flared out to form a flared portion 32 at an extreme end of the hose body 12B (refer to FIG. 3C).

Then, the hose body 12B provided with the flared portion 32 is subject to an atmospheric pressure plasma treatment at an inner surface of the connecting portion 22, and an inner surface of the connecting portion 22, specifically an inner surface of the innermost layer 16 of the connecting portion 22 is modified.

FIGS. 3D and 4 show steps of the atmospheric pressure plasma treatment.

In FIG. 4, reference numeral 34 indicates a pair of electrodes disposed in a treatment chamber 36 in which an atmospheric pressure is applied. The pair of the electrodes 34 include flat and smooth inner surfaces that are located parallel so as to keep a constant distance therebetween.

In the treatment chamber 36, glow discharge is generated between the pair of the electrodes 34. A gas (here, nitrogen gas) supplied from a gas cylinder 37 by a pump 38 is transformed into a plasma by the glow discharge. In the Figure, reference numeral 40 indicates the gas transformed into the plasma, namely a plasma gas.

The plasma gas 40 is created by electrolytic dissociation or ionization of gas molecules by the glow discharge and includes various chemical species such as ion, radicals, electrons, atoms, and molecules.

Reference numeral 42 indicates a holding die for the hose body 12B. The holding die 42 has a holding cavity or holding bore 44 in a center portion thereof. The hose body 12B is retained through the holding cavity 44 by the holding die 42.

Reference numeral 46 indicates an abutment die for an end portion of the hose body 12B. As shown also in FIG. 7, the abutment die 46 includes an insertion space 48, a gas introducing space 50 extending through the abutment die 46 in a direction away from the insertion space 48, continuously from the insertion space 48, and an abutment portion 52 for abutting against an end surface of the hose body 12B or an end surface of the flared portion 32.

Here, the abutment portion 52 serves for positioning an extremity of the hose body 12B to control an inserted length of the hose body 12B. And, the abutment portion 52 also serves as a blocking portion for blocking a plasma gas fed or introduced through the gas introducing space 50 from flowing around an outer peripheral surface of the hose body 12B.

As a result, the plasma gas fed through the gas introducing space 50 entirely flows into the hose body 12B.

In this embodiment, the abutment portion 52 is defined by walls rising in a direction perpendicular to an axis of the insertion space 48, at a position of an extremity of the hose insertion space 48.

As shown in FIGS. 3D and 4, in this embodiment, a core member 54 is disposed through a center portion of an inner hollow portion or an inner portion of the hose body 12B.

The core member 54 is set or placed so as to lie along an entire length of a portion of the connecting portion 22 of a straight tubular shape, namely a portion of the connecting portion 22 having an inner surface and an outer surface parallel to a direction of the axis, and an entire length of the flared portion 32.

When the core member 54 is set in the connecting portion 22, a center portion of a hollow interior or an interior of the connecting portion 22 including the flared portion 32 is occupied by the core member 54, and an annular space is defined between the core member 54 and an inner surface of the connecting portion 22.

Here, the core member 54 may have either a solid structure or a hollow structure, namely a pipe shape. When the core member 54 has the pipe shape, both ends or at least a right end of the core member 54 in the Figure should be closed or plugged.

Figure 5A:
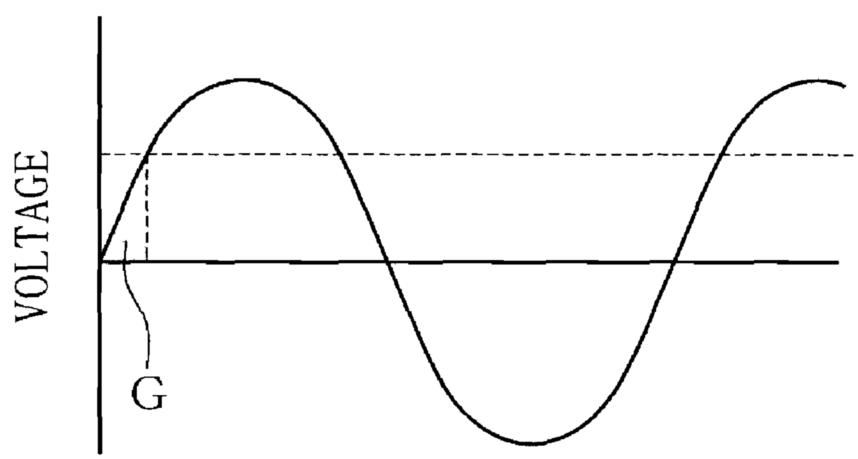
FIG. 5A is a diagram showing a region of voltage to be applied in a plasma treatment.
Figure 5B:
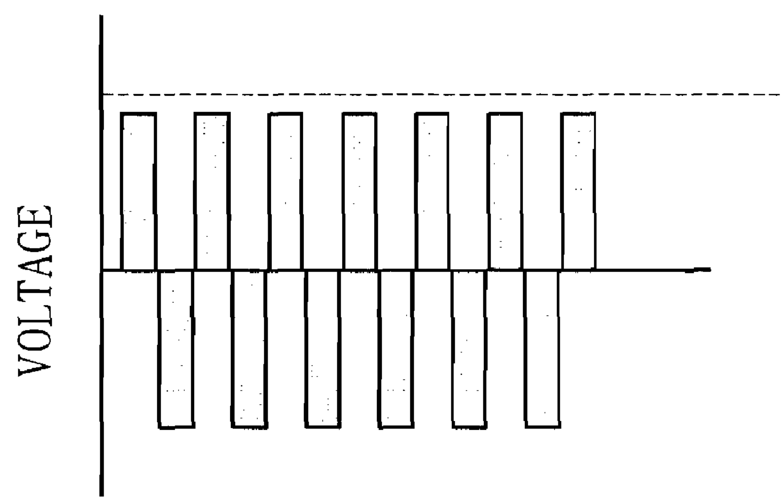
FIG. 5B is a diagram showing voltage to be applied in a form of pulse in the plasma treatment.
Figure 15:
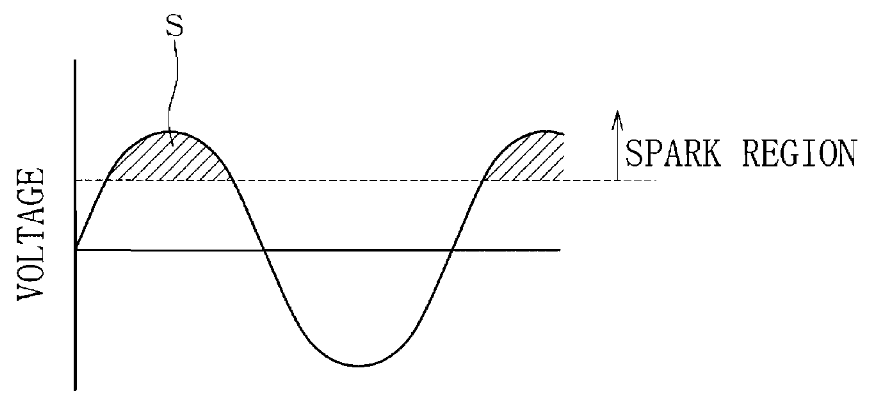
FIG. 15 is a diagram showing a region of voltage to cause spark discharge.
Figure 16:
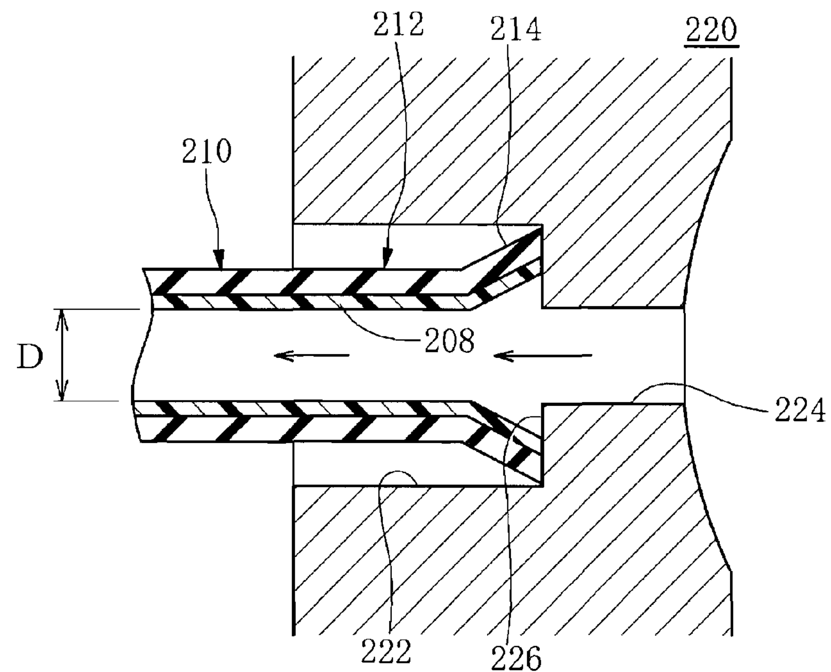
FIG. 16 is a view showing that an inner surface of a hose body is plasma treated by a conventional method.
Figure 17:
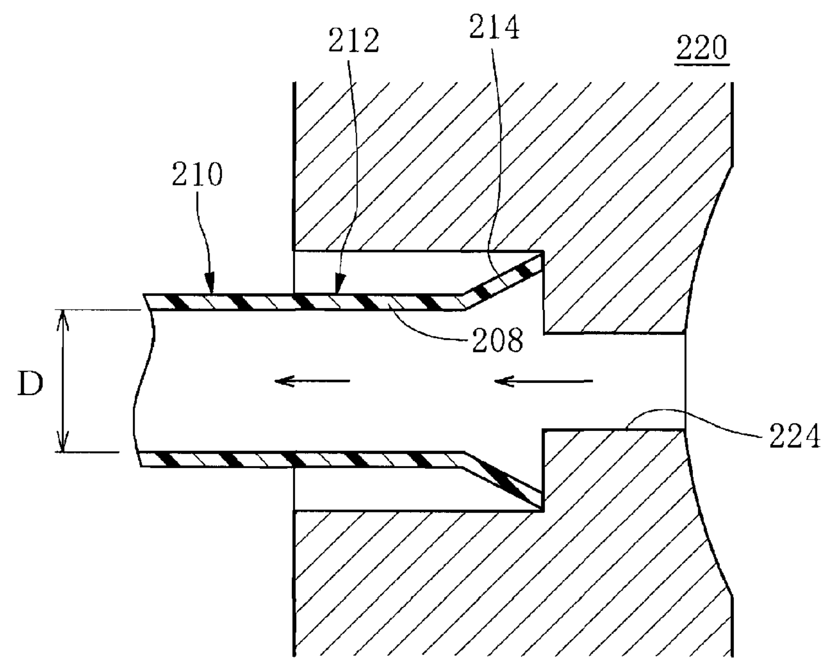
FIG. 17 is a view showing that an inner surface of a hose body with a large inner diameter is plasma treated by the method of FIG. 16.

In this embodiment, a low voltage is applied in a form of pulse as shown in FIG. 5B. The low voltage to be applied is lower than or not higher than the spark region of voltage shown in FIG. 15, and in a glow discharge region of voltage indicated by reference character G in FIG. 5A. Then, the glow discharge is generated in the presence of the gas fed from the gas cylinder 37 between the pair of electrodes 34 to transform the gas from the gas cylinder 37 into a plasma gas 40.

And, the plasma gas 40 created between the pair of the electrodes 34 is fed into the hose body 12B through the gas introducing space 50 of the abutment die 46, as shown in FIGS. 3D and 4.

The plasma gas 40 that is fed into the hose body 12B flows in the direction of the axis toward the left in the Figure, through the annular space defined between the outer surface of the core member 54 and the inner surface of the hose body 12B, specifically the inner surface of the connecting portion 22 including the flared portion 32 and the portion of the straight tubular shape. During this flow of the plasma gas 40, the plasma gas 40 acts on the inner surface of the connecting portion 22.

Figure 6:
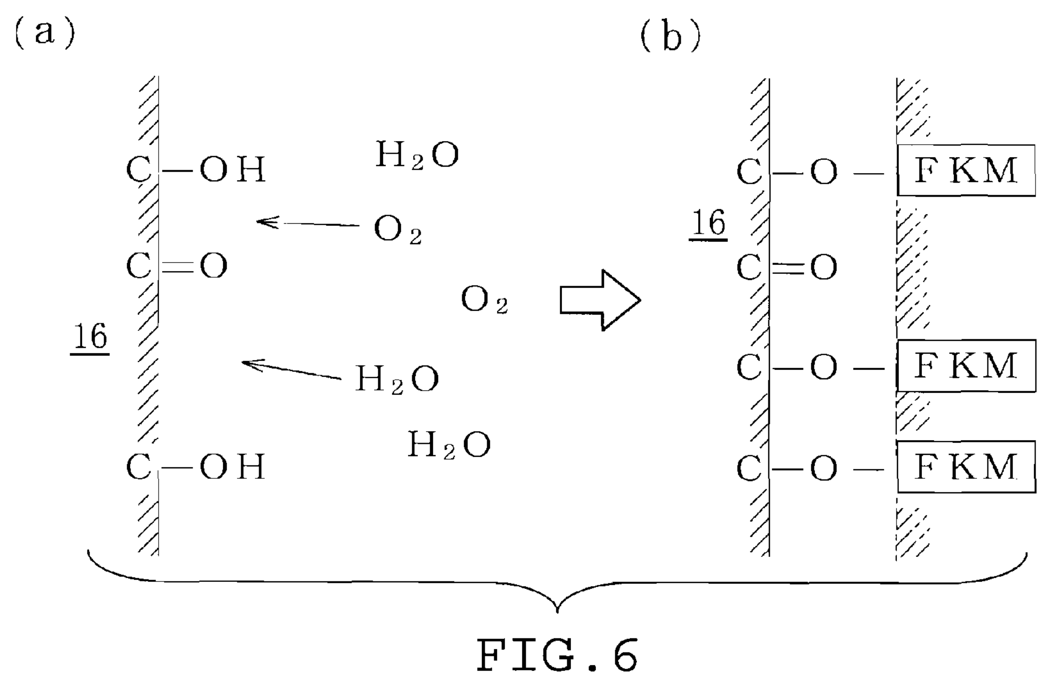
FIG. 6 is a schematic view for explaining surface modification in the plasma treatment.

As a result, the inner surface of the hose body 12B, specifically an inner surface of the innermost layer 16 of the connecting portion 22 is modified by an action of the introduced plasma gas 40 in the presence of oxygen and moisture or water vapor in the air, as shown in a schematic view of FIG. 6, and functional groups including oxygen is generated in the inner surface of the innermost layer 16. Specifically, functional groups such as carbonyl group and hydroxyl group are provided in the inner surface of the innermost layer 16 by dissociating reaction of organic binding and reaction with oxygen, moisture or water vapor, etc., in the air.

And, the inner surface of the innermost layer 16 is finely roughened by etching action of the plasma gas 40.

In the present embodiment, as shown in FIG. 3E, the hose body 12B that has been plasma treated is subsequently dipped or soaked in a coating liquid (dipping liquid) L to provide or coat the inner surface of the innermost layer 16 with a sealing layer 24 or a material for the sealing layer 24. The coating liquid L is prepared by dissolving fluorine-rubber in a solvent.

At the same time, an outer surface and a leading end surface of the connecting portion 22 of the hose body 12B is also coated with the sealing layer 24 or the material for the sealing layer 24.

Then, as shown in FIG. 3F, the sealing layer 24 thus provided is heated for a certain time period and vulcanized.

The sealing layer 24 made of fluorine rubber (FKM) itself is cross-liked by a vulcanizing agent contained in the sealing layer 24, at the same time, chemically reacted with a functional group generated in the inner surface of the innermost layer 16, for example, a hydroxyl group as shown in a schematic view of FIG. 6, thereby the sealing layer 24 is chemically adhered to the inner layer 16 strongly.

And, the coating of the sealing layer 24 formed on the innermost layer 16 is embedded in the finely roughened surface of the innermost layer 16, thereby also physically adhered to the inner surface of the innermost layer 16 strongly.

As stated above, a mating metal pipe 14 is force-fitted relatively in the hose 12 including the innermost layer 16 coated with the sealing layer 24 as shown in FIG. 3G. Here, the hose 12 and the metal pipe 14 are connected to each other in direct press-fit relation, thereby the hose 12 and the metal pipe 14 are unified to form a direct-connect hose assembly 10 (refer to FIG. 1).

Figure 8:
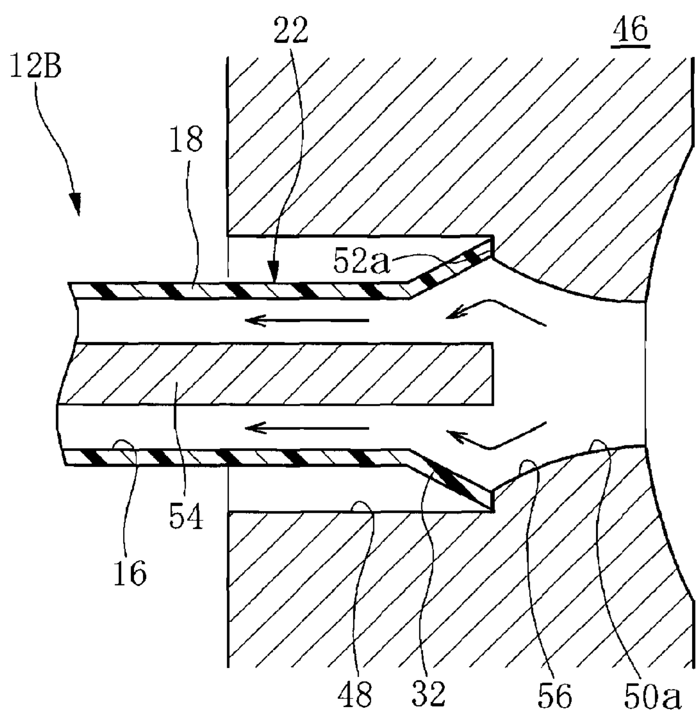
FIG. 8 is a view showing a relevant part of another embodiment of the present invention.

FIG. 8 shows another embodiment of the present invention.

Figure 7:
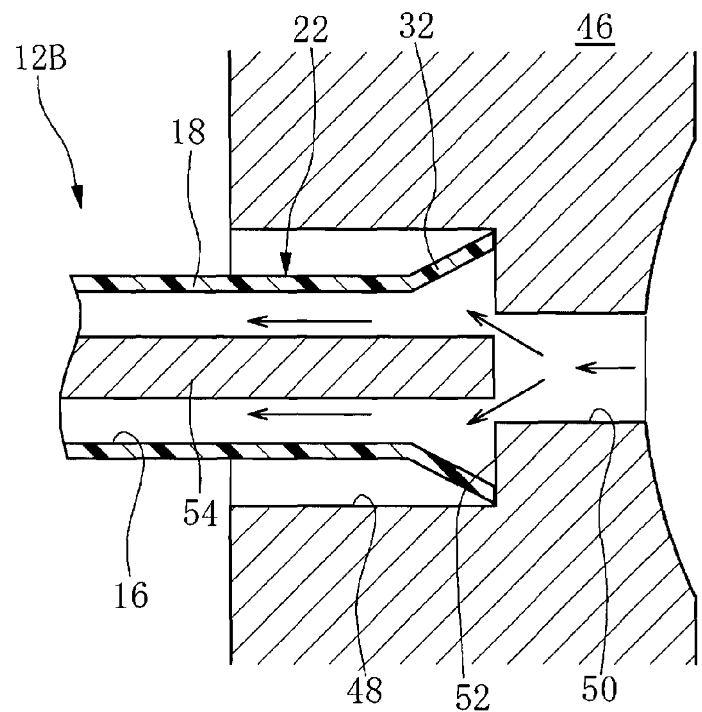
FIG. 7 is a view showing a relevant part of the embodiment of the present invention.

In the embodiment of FIG. 8, a gas introducing space 50 of FIG. 7 is modified into a gas introducing space 50*a*. The gas introducing space 50*a* is gradually radially expanded with a curved shape like a trumpet shape in a direction toward the hose insertion space 48. And, at an end position of the gas introducing space 50*a*, a guide portion 56 for guiding or introducing a plasma gas 40 fed through the gas introducing space 50*a* into an inner periphery of the leading end of the flared portion 32 is defined. Meanwhile, an abutment portion 52*a* has a smaller width compared to the abutment portion 52 of FIG. 7. Since this embodiment is otherwise the same as the embodiment of FIG. 7, identical elements are indicated by identical reference numerals, and thus an explanation thereof is omitted here.

In this arrangement, an inner diameter of the left end of the guide portion 56 in the Figure is equal to or generally equal to an inner diameter of the right end of the hose body 12B in the Figure, thereby the plasma gas 40 fed through the gas introducing space 50*a* is introduced in an inner periphery of the leading end of the flared portion 32.

Figure 9:
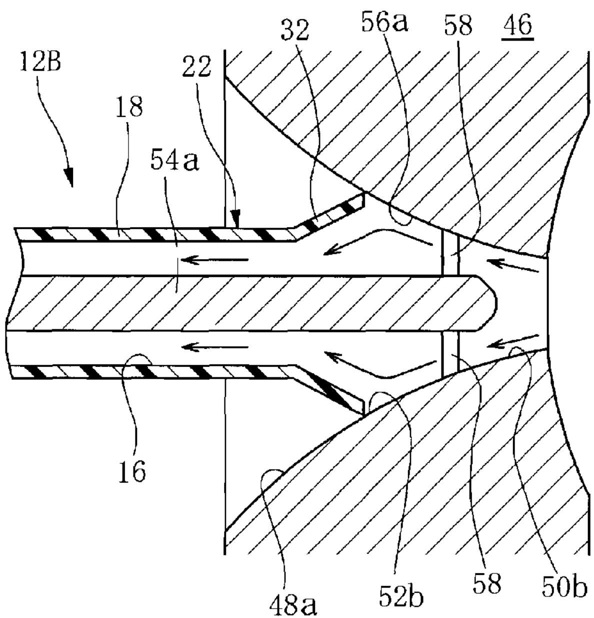
FIG. 9 is a view showing a relevant part of yet another embodiment of the present invention.

FIG. 9 shows yet another embodiment. In the embodiment of FIG. 9, the gas introducing space 50 and the insertion space 48 of FIG. 7 are modified into a gas introducing space 50*b* and a insertion space 48*a*. The gas introducing space 50*b* and the insertion space 48*a* define a continuous and smooth flared-out space of a trumpet shape, and at an end position of the gas introducing space 50*b*, a guide portion 56*a* is defined.

In the embodiment of FIG. 9, an abutment portion 52*b* is formed for being abutted with an outer periphery of the leading end of the flared portion 32.

And, in the embodiment of FIG. 9, the plasma gas 40 is reflected radially inwardly at a position of the guide portion 56*a* and the leading end of the flared portion 32 to act on an inner surface of the flared portion 32, thereby the inner surface of the flared portion 32 is modified.

In the embodiment of FIG. 9, unlike the core member 54 of FIG. 7, a core member 54*a* protrudes in a right direction in the Figure outwardly with respect to the flared portion 32, and this longitudinally protruded portion of the core member 54*a* is supported by an abutment die 46 via a support portion 58. Since this embodiment is otherwise the same as the embodiment of FIG. 7, identical elements are indicated by identical reference numerals, and thus an explanation thereof is omitted here.

Figure 10A:
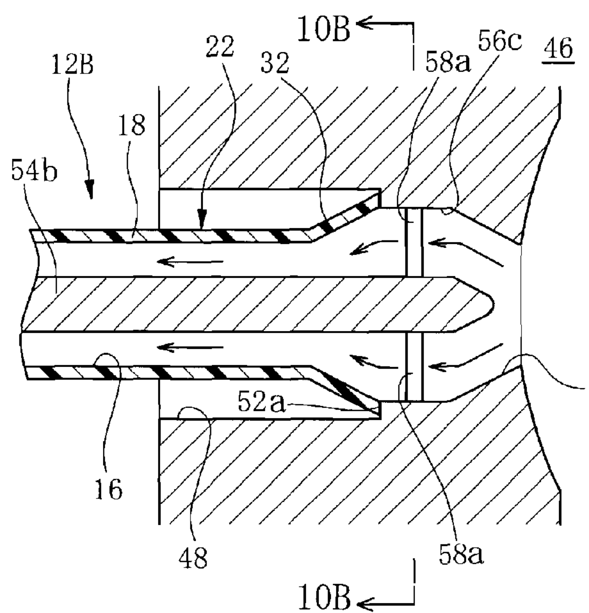
FIG. 10A is a view showing a relevant part of still another embodiment of the present invention.
Figure 10B:
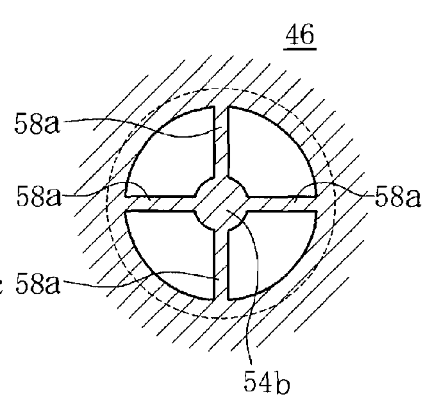
FIG. 10B is a cross-sectional view taken along a line 10B-10B in FIG. 10A.

And, in still another embodiment of FIG. 10, the gas introducing space 50 of FIG. 7 is modified into a gas introducing space 50*c*. The gas introducing space 50*c* is gradually radially expanded in a reverse-tapered manner in a direction toward the insertion space 48, then extends in a direction of an axis of the hose body 12B. And, a guide portion 56*c* is also gradually radially expanded in a reverse-tapered manner in a direction toward the hose body 12B, namely toward the insertion space 48, then extends in the direction of the axis of the hose body 12B. And, as in the embodiment of FIG. 9, a leading end portion of a core member 54*b* is protruded in the right direction in the Figure outwardly with respect to the flared portion 32, and a longitudinally protruded portion of the core member 54*b* is supported by the abutment die 46 via a support portion 58*a* that is slightly different from the support portion 58 in shape (the core member 54*b* is also slightly different from the core member 54*a* in shape). Since this embodiment is otherwise the same as the embodiment of FIG. 7, identical elements are indicated by identical reference numerals, and thus an explanation thereof is omitted here.

As stated above, according to the embodiments of the present invention, in order not to allow the plasma gas 40 fed to just flow or pass through the center portion of the hollow interior of the hose body 12B without effecting plasma treatment, the core member 54, 54*a* or 54*b* is disposed through the hollow interior of the hose body 12B so as to occupy the center portion of the hollow interior of the hose body 12B, and the plasma gas 40 is flown in the direction of the axis of the hose body 12B along the annular space defined between the outer surface of the core member 54, 54*a* or 54*b* and the inner surface of the hose body 12B, specifically the inner surface of the connecting portion 22 so as to cause the plasma gas 40 to act on the inner surface of the hose body 12B. According to this method, the plasma gas 40 fed into the hose body 12B can be entirely contacted with the inner surface of the connecting portion 22 of the hose body 12B with high efficiency. And, even in the large diameter hose having a large inner diameter, the inner surface of its connecting portion 22 can be modified effectively without particularly increasing flow-rate of the plasma gas 40 and without particularly increasing a time period for the plasma treatment.

So, consequently, the sealing layer 24 of an elastic material can be strongly adhered to an inner surface of a innermost resin layer of the connecting portion 22 with a high adhesion force.

Figure 11:
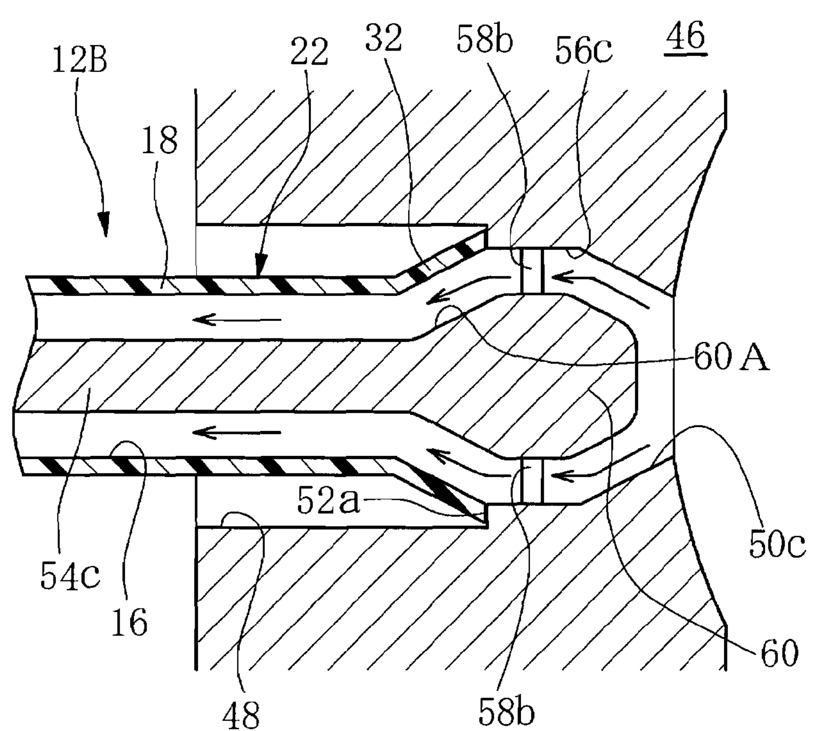
FIG. 11 is a view showing a relevant part of further embodiment of the present invention.
Figure 12:
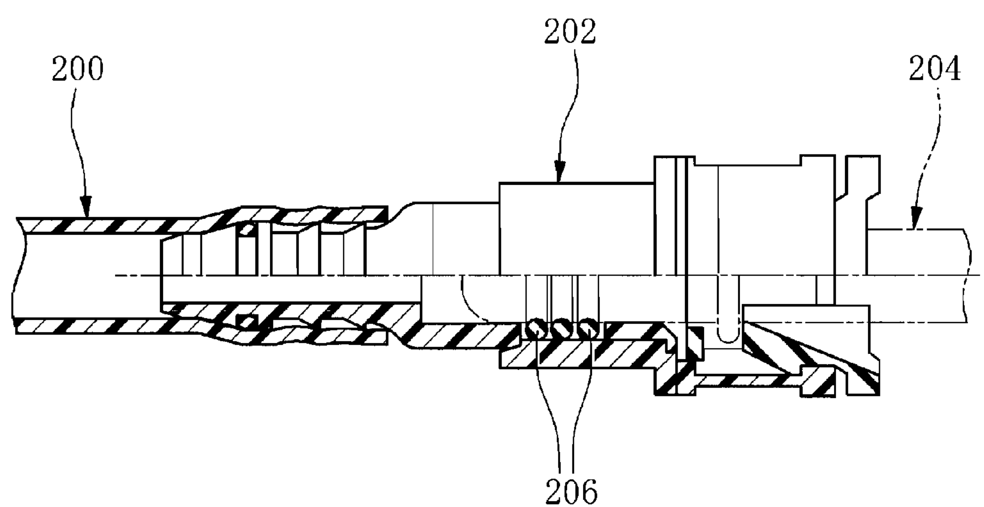
FIG. 12 is a view showing a conventional method for connecting a conventional hose and a metal pipe.
Figure 13A:
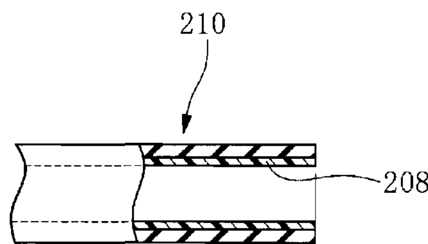
FIGS. 13A to 13E are views showing steps of a method for surface modification by corona treatment that is examined.
Figure 13B:
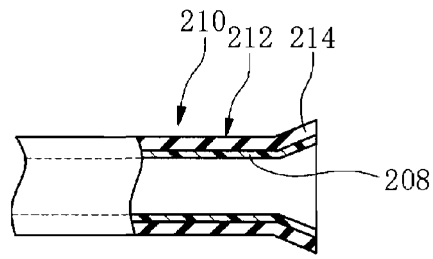
Figure 13C:
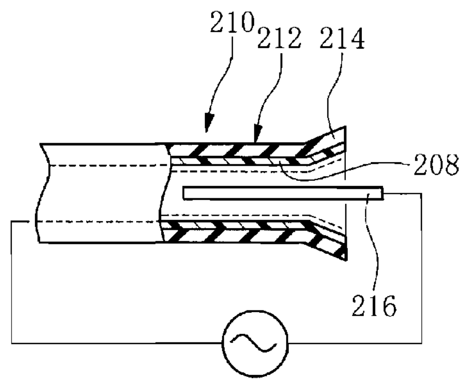
Figure 13D:
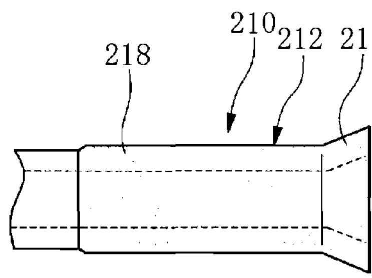
Figure 13E:
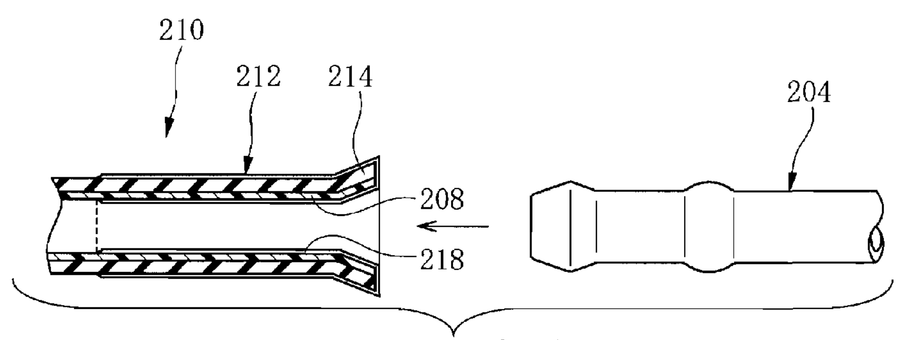
Figure 14:
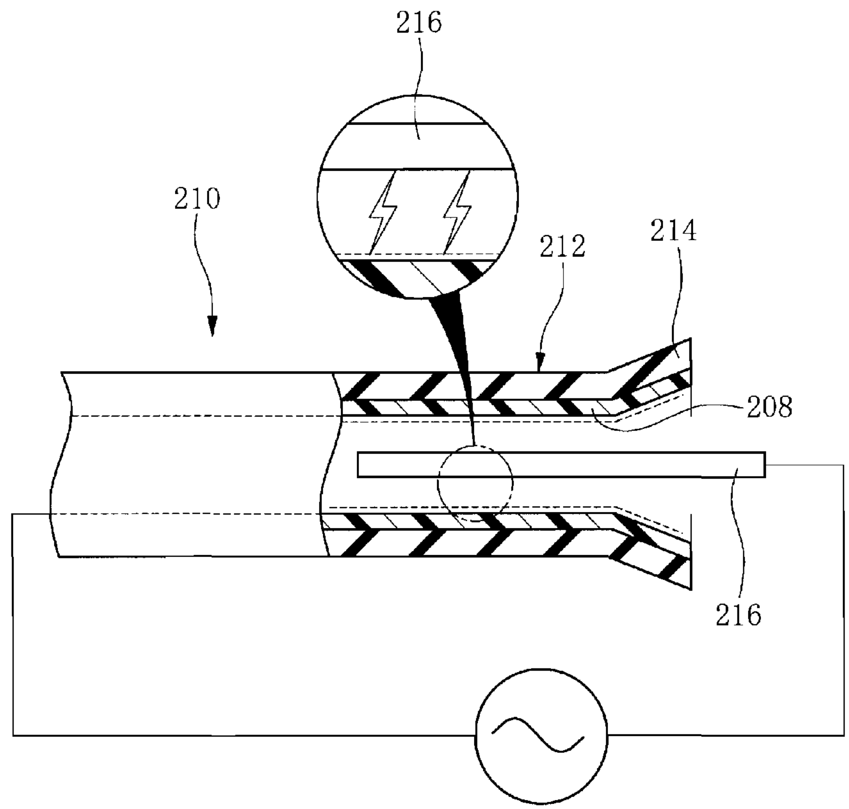
FIG. 14 is a view for explaining the step of FIG. 13C in more detail.

FIG. 11 shows further embodiment of the present invention.

In the embodiment of FIG. 11, the core member 54*b* of FIG. 10 is modified into a core member 54*c*. A leading end portion of the core member 54*c* is formed into a large diameter portion 60, thereby an annular space (namely a flow path of the plasma gas 40) defined between the flared portion 32 and the core member 54*c* can be conformed more closely to an annular space (namely a flow path of the plasma gas 40) defined between a portion of a connecting portion 22 of the straight tubular shape and the core member 54*c*, with respect to cross-sectional area.

Here, a portion of the large diameter portion 60 corresponding to the flared portion 32, specifically the portion of the large diameter portion 60 situated radially inward of the flared portion 32 has a contour (an outer shape) corresponding to the flared portion 32, and defines a tapered surface 60A.

In the embodiment of FIG. 11, since the cross-sectional area of the flow path of the plasma gas 40 situated radially inward of the flared portion 32 can be close to or nearly equal to that of the flow path of the plasma gas 40 situated radially inward of the portion of the connecting portion 22 of the straight tubular shape, an inner surface of the flared portion 32 is further favorably modified. Since this embodiment is otherwise the same as the embodiment of FIG. 10, identical elements are indicated by identical reference numerals, and thus an explanation thereof is omitted here.

Although the preferred embodiments have been described above, these are only some of embodiments of the present invention.

In each of the above embodiments, the resin layer 18 defines an outermost layer of the hose 12. However, for example, the present invention may be applied to a hose including an outermost rubber layer (protector) further laminated on the resin layer 18. As stated, the present invention can be embodied by a variety of modifications without departing from the scope of the invention.

What is claimed is:

1. A method for producing a hose with a sealing layer, comprising:

preparing a hose body having a resin layer defining an innermost layer, the hose body including a connecting portion on an end portion of the hose body for being connected to a mating pipe, the connecting portion having a straight tubular portion including an inner surface and an outer surface that extend parallel to a direction of an axis of the hose body;

disposing a core rod through a center portion of a hollow interior of at least the straight tubular portion of the connecting portion so as to occupy the center portion, the core rod not allowing a gas to flow through the interior of the core rod, the core rod being constructed so as to allow the gas that is fed in a hollow interior of the hose body to entirely contact the inner surface of the hose body;

feeding a plasma gas created by generating a glow discharge between a pair of electrodes in an interior of the innermost layer of the connecting portion of the hose body, distributing the plasma gas from an open end of the connecting portion inwardly in the direction of the axis along an annular space defined between an outer surface of the core rod and an inner surface of the innermost layer to act on the inner surface of the innermost layer, and thereby modifying the inner surface of the innermost layer; and forming a sealing layer on the inner surface of the connecting portion in adherent relation thereto by coating an elastic material for the sealing layer on the inner surface of the connecting portion after modifying the inner surface of the innermost layer.

2. The method for producing the hose with the sealing layer as set forth in claim 1, wherein the connecting portion of the hose body includes a flared portion that is radially expanded in a trumpet shape at an extremity of the connecting portion, the method further comprising:

disposing the core rod also through a center portion of a hollow interior of the flared portion, and distributing the plasma gas also through an annular space defined between an outer surface of the core rod and an inner surface of an innermost layer of the flared portion.

3. The method for producing the hose with the sealing layer as set forth in claim 2, wherein the core rod has a larger diameter at a portion thereof situated in the hollow interior of the flared portion than at a portion thereof situated in the hollow interior of the straight tubular portion.

4. The method for producing the hose with the sealing layer as set forth in claim 1, wherein the resin layer is made of a melt-formable resin.

5. The method for producing the hose with the sealing layer as set forth in claim 1, wherein the resin layer is made of a fluorine-resin.

6. The method for producing the hose with the sealing layer as set forth in claim 1, wherein a major component of the resin layer is selected from the group consisting of ethylene tetrafluoroethylene, thermoplastic polyether-ester elastomer, polybutylene terephthalate, polyphenylene sulfide, polyethylene and polypropylene.

7. The method for producing the hose with the sealing layer as set forth in claim 1, wherein the hose is adapted for vehicles.

8. The method for producing the hose with the sealing layer as set forth in claim 1, wherein the plasma gas is an atmospheric pressure plasma gas.

9. The method for producing the hose with the sealing layer as set forth in claim 1, wherein the core rod has a solid structure.

10. The method for producing the hose with the sealing layer as set forth in claim 1, wherein the core rod has a hollow structure, and at least one end of the core rod is closed.

11. The method for producing the hose with the sealing layer as set forth in claim 1, wherein nothing is interposed between the outer surface of the core rod and the inner surface of the innermost layer.

12. The method for producing the hose with the sealing layer as set forth in claim 1, wherein the core rod is placed so as to lie along an entire length of the straight tubular portion of the connecting portion.

13. The method for producing the hose with the sealing layer as set forth in claim 2, wherein the core rod is placed so as to lie along an entire length of the straight tubular portion and an entire length of the flared portion of the connecting portion.

* * * * *